United States Patent
Veliadis

[11] Patent Number: 5,942,806
[45] Date of Patent: Aug. 24, 1999

[54] METHOD AND DEVICE FOR GENERATING ELECTRICITY

[76] Inventor: Konstantinos D. Veliadis, 520 Salem St., Lafayette, Ind. 47905

[21] Appl. No.: 08/695,135

[22] Filed: Aug. 8, 1996

[51] Int. Cl.⁶ .................................................. H02P 9/04
[52] U.S. Cl. .............................. 290/1 R; 290/2; 290/46; 290/1 A
[58] Field of Search ................................ 290/1 R, 44, 55, 290/1 P

[56] References Cited

U.S. PATENT DOCUMENTS

| | | | |
|---|---|---|---|
| 4,206,396 | 6/1980 | Marks | 290/44 |
| 4,314,192 | 2/1982 | Caro | 322/2 R |
| 4,433,248 | 2/1984 | Marks | 290/44 |
| 4,489,269 | 12/1984 | Edling et al. | 322/2 |

FOREIGN PATENT DOCUMENTS 0571786  10/1977  U.S.S.R. .

*Primary Examiner*—Elvin G. Enad
*Attorney, Agent, or Firm*—Woodard, Emhardt, Naughton Moriarty & McNett Patent and Trademark Attorneys

[57] ABSTRACT

A method and device for generating an electric current and power from the earth's electric field. The electric current is generated by providing a thermoemissive material at some distance above the earth's surface, connecting the thermoemissive material to the earth's surface with a conductor (e.g., wire) such that a conductive path is established between the thermoemissive material and the earth's surface through the conductor, and heating the thermoemissive material to cause it to emit electrons into the surrounding air, thereby drawing replacement electrons from the earth's surface through the conductor to the thermoemissive material. One way to produce power in the above setting is by installing a D.C. electric motor or other electrical device along the said conductive pathway.

5 Claims, 1 Drawing Sheet

METHOD AND DEVICE FOR GENERATING ELECTRICITY

FIELD OF THE INVENTION

The present application relates generally to a method and device for producing electricity, and more particularly to a method and device for generating an electric current and power using the earth's electric field.

BACKGROUND OF THE INVENTION

It is known that the earth is under a relatively strong electric field, observed between the surface of the earth and its surrounding air. This field arises from the fact that the air has a net excess of positive ions (i.e. is positively charged), whereas the earth's surface has a net excess of electrons (i e. is negatively charged). By the laws of electrostatics, each of these net charges tends to be uniformly distributed everywhere in the air and on the ground surface, respectively.

In spite of these quasi-uniform distributions, the induced electric field is still relatively strong, approximately 130 V/m measured on the surface of the sea. Although this voltage looks attractive for generating electricity, the problem is that it is accompanied by a relatively small electric-current density: the air's net positive-ion density $n_i$ is very low, so that the resulting net ion-current density $J=n_i \times v_i$ toward the earth's surface is almost zero. Thus, for example, if one connects one bare end of an insulated wire with the earth's surface (negatively charged) and the other bare end with a horizontal metallic surface in the (positively charged) air, one would measure very little current flowing through the wire, proportional to the exposed area of the metallic surface. Accordingly, to date there has been no successful way developed to use the earth's electric field for significant electricity production.

A need therefore exists for a method of generating electricity by taking advantage of the earth's electric field. The present invention addresses that need.

SUMMARY OF THE INVENTION

Briefly describing one aspect of the present invention, there is provided a method for generating an electric current and power using the earth's electric field. The electric current is generated by providing a thermoemissive material at a distance above the earth's surface, connecting the thermoemissive material to the earth's surface with a conductor so that a conductive path is established between the thermoemissive material and the earth's surface through the conductor, and heating the thermoemissive material to cause it to emit electrons into the surrounding air, thereby drawing replacement electrons from the earth's surface through the conductor to the thermoemissive material. Electric power is produced by installing a direct-current electric motor or other electrical device somewhere along the conductive path. One objective of the present invention is to provide a method for generating an electric current and power. Further objectives and advantages of the present invention will be made obvious by the following description of the preferred embodiments.

DESCRIPTION OF THE PREFERRED EMBODIMENTS

Figure 1:
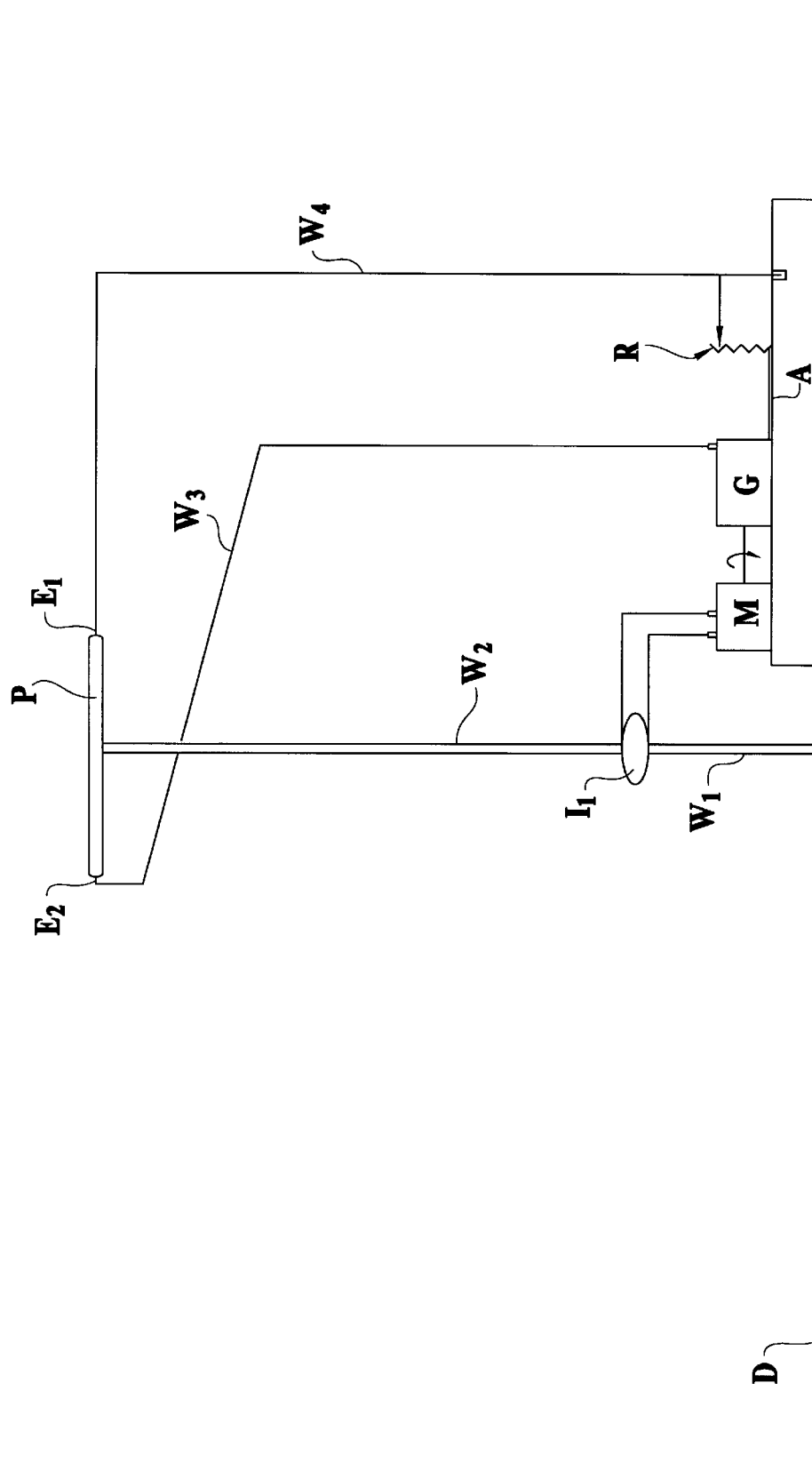
FIG. 1 shows the apparatus of the present invention, according to one preferred embodiment, where:
W—wire or other electrical conductor;
D—conductive disc, in contact with one end of $W_1$;
M—direct-current (D.C.) electric motor;
G—alternating-current (A.C.) generator, powered by M;
P—thermoemissive material, could be a plaque or plate;
E—electrode, in contact along one whole side of P;
R—roostat, or other suitable voltage-regulating device;
A—conductor, connecting a pole of G with an end of R; and
$I_1$—insulating material, which takes on the weight of $W_2$, P, $E_1$, $E_2$ and part of $W_3$ and $W_4$. That weight is passed on to $W_1$, and from there onto D. Other weight-supporting schemes are possible.

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As previously indicated, the present invention relates generally to a method for generating an electric current and power by taking advantage of the earth's electric field. The method generally comprises providing a thermoemissive material at some distance above the earth's surface, connecting the thermoemissive material to the earth's surface with a conductor (e.g., wire) and heating the thermoemissive material to cause it to emit electrons into the surrounding air, thereby drawing replacement electrons from the earth's surface through the conductor to the thermoemissive material. A sample apparatus for practicing the present invention is shown in FIG. 1.

One of the most critical elements of the inventive apparatus is the thermoemissive material. For the purposes of this invention, a thermoemissive material is any material that emits electrons when appropriately heated or irradiated. In some preferred embodiments the thermoemissive material ("thermat") is a solid sheet or layer, while in other embodiments the thermat is in a molten or fluid state.

Preferred thermats include pure metals (such as Mo), and their alloys, and unsintered or sintered ceramics (especially metallic ceramics, "cermets", such as Mo-sintered BaO/SrO). Ni/BaS and Pt/BaS sintered cermets are preferably used in some embodiments.

As shown in FIG. 1, the thermat may be plated onto a plaque which is suspended (e.g., horizontally) at some distance above the earth's surface. Preferably, the thermat is suspended at a distance of at least a two meters above the earth's surface. As is known to the art, the magnitude of the potential difference increases with increasing height above the earth's surface (except for random effects of significantly reduced local net-ion density in the surrounding air), so the higher the thermat is placed above the earth's surface (up to a naturally-prescribed limit), the greater the total voltage available for producing electricity.

The thermat is generally connected by a conductor to the earth's surface. In one preferred embodiment the conductor is copper wire, although other materials, especially tungsten, may be used. The conductor provides a conductive path for electrons to pass from the earth's surface, through a D.C. electric motor, to the thermat, where they are emitted into the surrounding air. The D.C. electric motor powers a generator, which in turn produces the A.C. electricity. In one embodiment the conductor is made of many thin wires, as further described below.

With the present invention the thermat must first be heated to put it in a state of emitting electrons. Once electrons are being emitted from the thermat, they will be driven away (skywards) by the earth's electric field and simultaneously be scattered by collisions with air molecules. That emission will cause replacement electrons to be drawn through the conductive path to the thermat, forming the electric current that powers the D.C. electric motor. When the thermat has been heated to the point that the desired level of constant flow of electrons is fully established, a steady state operation of the device has been achieved.

Because it is necessary to keep the thermat hot, the conductors attached to it will also heat-up and may thus need adequate cooling to keep their temperature down. To this end, the conductors W can be left partially or totally uninsulated, with the many and thin individual wires of each pulled apart from one another and their bare surface roughened, for maximum ventilation effect. Also, many thin cooling ffins can be vertically welded all over the free upper surface of the disc, made of the same material as the disc and with their outer surface roughened. Lastly, the free upper surface of the disc can be carefully sprayed periodically with regular tap water, to induce on it refrigeration via evaporation of liquid $H_2O$. Additional cooling measures, such as artificial refrigeration of the conductors W and/or the disc, etc., can also be adopted if necessary.

The basic procedure for practicing the present invention, according to one preferred embodiment, is described below. First, a small piece of land with a generally flat area is selected. The elevation of the land is preferably close to sea level. All bushes and/or trees are removed from inside a 10-meter radius of the geometric center of the flat area of the land. All other trees or bushes in the flat area of the land are trimmed, so that none exceeds in height the elevation of the thermat to be installed.

Moist soft soil is provided over the 10-meter radius of the flat-ground area described above, to a thickness of about 70 centimeters. A copper disc D, approximately 20 meters in diameter and 10 cm in thickness, is laid horizontally on the soft soil. This disc is the base of the device. For best operation of the device, the disc D is connected with one or more thick (uninsulated) copper wires to seawater (if the sea is nearby). In other situations, lakewater, riverwater or even the main pipe of potable tap-water can be used to establish electrical connection with the disc.

One end of a copper wire $W_1$ is welded to the center of the (upper) surface of the copper disc D. Wire $W_1$ is positioned perpendicular with respect to the copper disc D, and its other end is steadfasted (fixed) to the bottom of an insulating material $I_1$.

A second copper wire $W_2$ has one end steadfasted (fixed) to the top of $I_1$ and extends upward from $I_1$. The upper end of $W_1$ and the lower end of $W_2$ are respectively connected (via externally insulated conductors) to the two poles of a D.C. electric motor M. The weight of the motor is preferably supported with a pedestal base fastened on the copper disc D and made of a strong, hydrophobic, insulating plastic; the motor's weight is not carried at all then by $W_1$.

An A.C. generator G is mounted on a similar pedestal base; that base is also fastened on the copper disc D and its height and position are chosen such that the rotating axis of the generator is along the same straight line as that of the motor M. The motor's rotor is then mechanically joined with the generator's rotor. The proper thermal-expansion/contraction margin for the two rotors is allowed in the design of their mechanical joint.

The generator and the motor must not be in contact with any materials except for the externally insulated conductors whose ends are electrically attached to their poles, the insulating pedestals they sit on, the mechanical joint between their rotors, and the surrounding air.

To protect from the rain, the whole system (except for the thermat)may be placed under a waterproof tent, preferably made of thin plastic. The bottom part of the walls of the tent is cut-off and removed (e.g. the bottom 1 meter), to secure adequate ventilation and cooling of the device.

The composite thermoemissive plaque simply consists of a tungsten sheet whose one free surface is plated with a very thin (e.g. 0.1 micron) layer of the thermoemissive material of choice (e.g. 50% $BaO$+50% $SrO$). Such plaques have already been made and tested for their thermoemissivity routinely, as mentioned in the pertinent literature. An example of such a fabrication is given in the next two paragraphs. First, a very thin (e.g. 0.1 micron) ceramic sheet is supported horizontally via four thin rods, that are made of insulating material and are placed at the four corners of the mid-rectangle of one side (referred to henceforth as "the bottom") of the sheet. The melting point of the insulating material of the rods must be higher than the melting point of tungsten. For example, cement or a ceramic material may be used.

A tungsten sheet of the same perimeter as the ceramic sheet is then placed on the top-surface of the latter, so that their four edges align exactly. The bottom of the ceramic sheet is then heated until its top (where the tungsten sheet rests) reaches the melting point of tungsten; this temperature is maintained until the tungsten sheet thermally bonds with the top of the ceramic sheet by infusion of liquid tungsten into the microscopic pits, scratches and cracks of the top-surface of the ceramic sheet.

When the above process is over, the thermoemissive plaque P has been formed and is allowed to cool down to room temperature, via natural convection.

The upper (free) end of the wire $W_2$ is made of tungsten and is welded to the center of the tungsten surface of the plaque, so that the $W_1$-$I_1$-$W_2$ structure supports the plaque and, via the electric motor M, also provides the link for the plaque's electric contact with the ground.

In one embodiment, an electrode is attached along each of two opposite sides of the tungsten's periphery on the thermoemissive plaque P. One such electrode, $E_2$, is connected by the conductor $W_3$ to one pole of the generator G, and the other such electrode, $E_1$, is connected via the conductor $W_4$ to a very strong electric heat resistance, which is part of a very large roostat R, whose steady arm (conductor) A is in turn connected to the other pole of the generator. The purpose of this auxiliary circuit between the generator's two poles, is to electrically heat the thermat, to cause the emission of electrons from the thermat into the surrounding air. Of course, other means for heating the thermat may be used, such as very hot gas(es), electromagnetic or other radiation, etc. When electrical-resistance heat is used as shown in the preferred embodiment, all electric connections are preferably done with insulated copper wires, and, in the vicinity of the plaque, tungsten wires.

As one example of how the device may be started, an external electric power source that can supply 5000V and 2000 A (10 MW) D.C. to the poles of the electric motor may be used. Such a power source could be one or more diesel engines coupled with the proper generator(s); or a transformer with A.C. input from the city network and 5000V/ 2000 A D.C. output. A roostat can regulate the percentage of the above external electric power given to the motor.

When the above 100 MW electricity is supplied to the motor, the generators roostat R FIG. 1 is set so that all the electric output of the generator G goes through the whole regulating resistance of FIG. 1. Gradually, more of the generator's power is slowly provided for heating the thermat, causing the device to start delivering its own electricity on the motor (at 5000V D.C.). Simultaneously, we start lowering the externally-supplied D.C. current to the motor, so that the total D.C. current supplied to the motor is at all times kept constant at 2000 A. This procedure is continued until all 2000 A D.C. delivered to the motor eventually come from electrons flowing from the copper disc D to the thermoemissive plaque P. Steady-state operation of the device has then been achieved.

Other start-up procedures for heating-up the thermat and bringing the device to a desired steady state of operation exist. For example, the thermat may be bombarded with electromagnetic radiation and/or hot gas(es), etc. In one preferred embodiment, hot gases are used to heat the thermat and bring the device to its steady state of operation.

It is to be appreciated that some secondary components of the device have not been illustrated in the Figure, because they would make the schematic too dense in detail and hard to understand. For example, the external power supply used to start-up the operation of the device has not been shown, although persons of skill in the art can easily appreciate its role.

While the invention has been illustrated and described in detail in the drawing and the foregoing description, the same is to be considered as illustrative and not restrictive in character, it being understood that only the preferred embodiment has been shown and described and that all changes and modifications that come within the spirit of the invention are desired to be protected.

What is claimed is:

1. A method for generating an electric current and power, comprising:

(a) providing a thermoemissive material positioned above the earth's surface;

(b) connecting the thermoemissive material to the earth's surface with a conductor, so that a conductive path is established between the thermoemissive material and the earth's surface through the conductor;

(c) providing a D.C. electric motor or other electrical device to harness the electric energy produced; and (d) heating the thermoemissive material to cause it to emit electrons into the surrounding air, thereby drawing replacement electrons from the earth's surface through the conductor to the thermoemissive material.

2. An apparatus for generating an electric current and power, comprising:

(a) a thermoemissive material positioned above the surface of the earth;

(b) a conductive path between the earth's surface and the thermoemissive material;

(c) a direct-current electric motor or other electrical device, operatively positioned to harness the electric energy produced;

(d) an arrangement for heating the said thermoemissive material, so that electrons are emitted from the latter; and, if an electric motor is chosen in (c) above, (e) a generator (optional) for generating electricity from the power provided by said electric motor.

3. The apparatus of claim 2 wherein said thermoemissive material is provided as a plaque.

4. The apparatus of claim 2 wherein said thermoemissive material is a sintered or unsintered ceramic material, or any metal or metallic alloy, or any combination thereof, operating at any state of interest.

5. The apparatus of claim 4 wherein said thermoemissive material is selected from the group consisting of BaO, SrO, Mo-sintered BaO/SrO, Ni/BaS, Pt/BaS, Ni, Pt, Sr, Mo, K, Na, Ba, S, Cs, Ca, Li and Fr, or combinations thereof.

* * * * *